Oct. 8, 1940.  W. M. NIEHART  2,217,130
SPRAY DRAFT UNIT FOR HUMIDIFYING AND TEMPERATURE CONTROL APPARATUS
Filed May 9, 1939
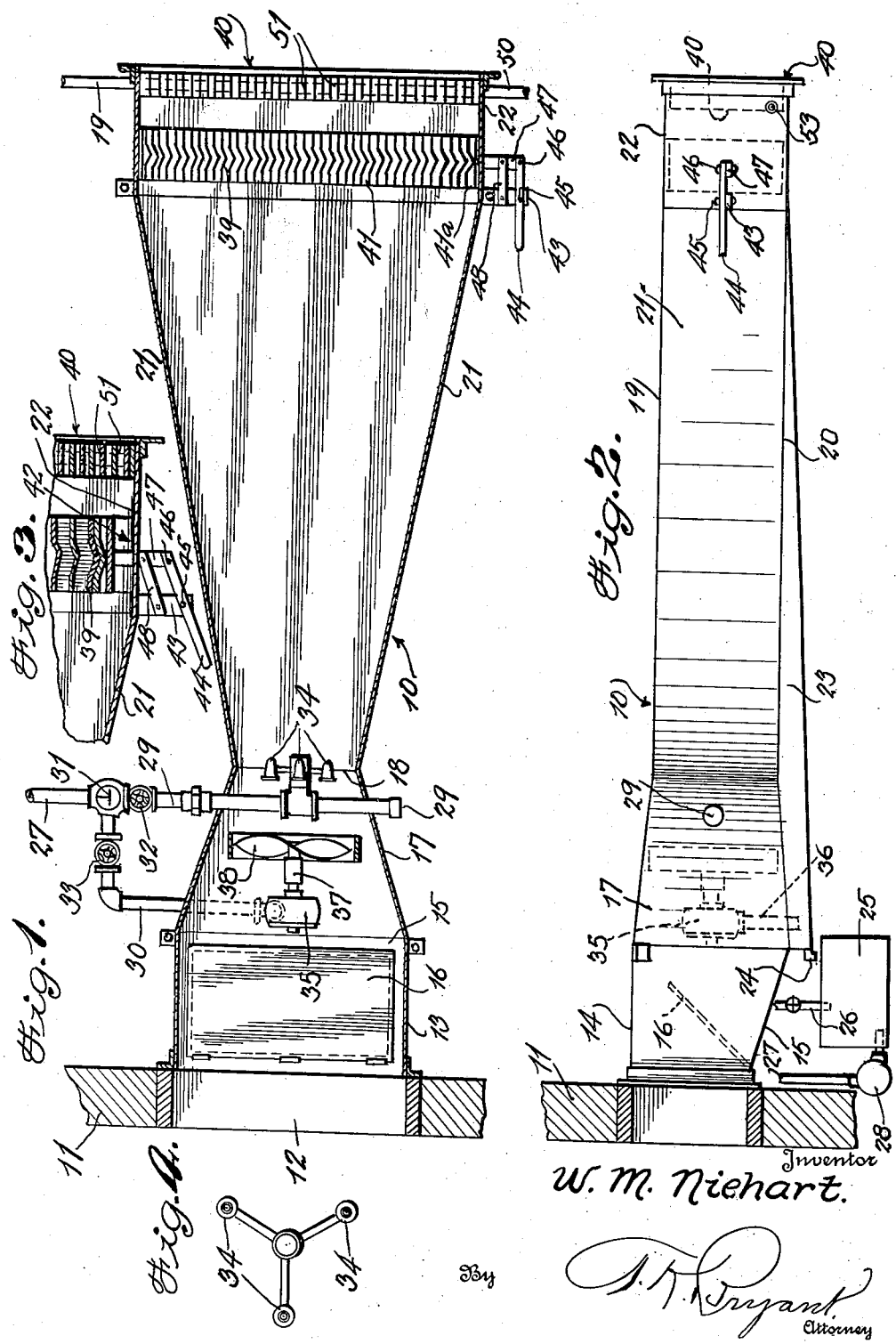

Patented Oct. 8, 1940

2,217,130

UNITED STATES PATENT OFFICE 2,217,130

SPRAY DRAFT UNIT FOR HUMIDIFYING AND TEMPERATURE CONTROL APPARATUS

William Marion Niehart, Los Angeles, Calif.

Application May 9, 1939, Serial No. 272,706

3 Claims. (Cl. 261—9)

This invention relates to a spray draft unit for humidifying and temperature control apparatus of the general type disclosed in the patent granted to Norman H. Gay for Humidifying and temperature control apparatus for citrous fruit storages and like structures on January 5, 1937, Patent No. 2,066,832, and embodies definite improvements in the art, especially with reference to the Gay patent and more particularly to the spray draft unit portion thereof.

The primary object of the invention is to provide means for controlling the humidity and temperature of air circulated through a storage space, especially for citrous fruits, such as oranges, lemons, and limes, and wherein a spray draft unit of general Venturi construction has arranged in the throat portion thereof a water spray device and a fan selectively or jointly operated with the spray device operating alone for effecting the movement of air through the draft unit, the fan operating alone for effecting the flow of air through the Venturi construction without the adding of moisture thereto, while the joint operation of the spray device and fan effects the flow of a greater volume of air through the draft unit in a controlled humidified condition.

A further object of the invention is to provide a spray draft unit of the foregoing character wherein a draft unit of the general Venturi construction has a spray device and turbine operated fan mounted within the draft unit in proximity of the throat portion of the Venturi construction with means controlling the supply of water to the spray device and turbine that is delivered thereto under the same pressure and through the same piping system.

It is a further object of the invention to arrange an eliminator adjacent the discharge end of the spray draft unit that is composed of a plurality of vertically disposed crenelated blades nested in normally spaced relation and operative for precipitating excess moisture from a current of air flowing through the unit with a blade at one side of the eliminator group being shiftable to increase the flow area at one side of the eliminator for the controlled flow of fog from the unit.

It is a still further object of the invention to provide a selectively heated and cooled surface at the discharge end of the unit for a more definite regulation of the temperature of air flowing through the unit.

With the above and other objects in view that will become apparent as the nature of the invention is better understood, the invention consists in general of certain novel details of construction and combination of parts hereinafter more fully described, illustrated in the accompanying drawing, and specifically claimed.

In the drawing:

Figure 1 is a longitudinal horizontal sectional view of a spray draft unit constructed in accordance with the present invention, a part of the building or abutment wall with which the same is associated being illustrated in section, Figure 2 is a side elevational view of the spray draft unit, a part of the water circulating apparatus being fragmentarily illustrated, while the associated wall of the apartment or building is shown in section, Figure 3 is an enlarged fragmentary sectional view of the discharge end of the draft unit showing one of the eliminator blades at the side of the unit shifted inwardly to provide a fog area at the discharge end of the unit, and Figure 4 is an elevational view of the multiple spray device.

The spray draft unit forms a part of the humidifying and temperature control apparatus especially designed for citrous fruit storages and like structures wherein, for example, lemons, oranges, limes and the like are stored and said spray draft unit is operative for maintaining a desirable temperature in the storage chamber with air circulated through the storage chamber of the proper humidity for the preservation of fruit stored therein. The spray draft unit is of general Venturi construction and arranged within the throat of said construction or in proximity to said throat is a water spray device and a fan, the latter being preferably driven by a turbine with the water spray device and fan selectively or jointly operated so that the action of the water spray device operating alone causes the flow of air through the spray draft unit and through the storage chamber, the fan when operating alone effecting the circulation of air without humidification thereof, while the water spray device and fan when jointly operated effecting an increased volume of flowing humidified air. The discharge end of the Venturi construction of the spray draft unit has an eliminator extending across the same which comprises a series of perpendicular crenelated blades nested in spaced relation to form tortuous passages therebetween for the precipitation of excess water from the humidified air when flowing therethrough at dew point humidity, the eliminator blade at one side of the eliminator construction being shiftable to increase the flow area through the eliminator for the passage of humidified air in the form of a fog and for the increase of humidification of the air in the storage chamber. The invention further includes a heating or cooling surface at the extreme outlet end of the spray draft unit so that air in a dry or humidified condition flowing through the spray draft unit may be either heated or cooled and discharged therefrom for circulation through the storage chamber with the desired degree of temperature.

Referring more in detail to the accompanying drawing, the spray draft unit is designated in general by the reference character 10 and is disposed within a storage chamber, room or apartment in which is stored such citrous fruits as lemons, oranges, limes and the like, the spray draft unit being preferably disposed adjacent the ceiling of the storage chamber and in proximity of the wall 11 in line with the wall window or opening 12, the spray draft unit being horizontally disposed and supported in any suitable manner.

More specifically, the spray draft unit comprises an inner end formed of straight side walls 13, a top wall 14, and an upwardly inclined bottom wall 15, the inner end of the unit being open as shown in Figure 1 and in communication with the wall opening 12 so that external air may flow through the wall opening 12 into the storage chamber through the spray draft unit. An upwardly opening damper 16 is associated with an opening in the bottom wall 15 of the inner end of the unit and is adjustable to regulate the inlet of outside air to the spray draft unit and the recirculation of air in the storage chamber through the unit.

The inner end of the spray draft unit is of relatively short dimensions and the forward portion thereof carries tapering top, side and bottom walls 17 that extend to the point 18 and from which point 18 the spray draft unit has substantially parallel top and bottom walls 19 and 20 and outwardly flaring side walls 21, the walls 19 to 21 being of considerable length and terminating in a relatively short outer end section 22 having parallel walls. The spray draft unit 10 is of Venturi construction, afforded by the reduced diameter at the point 18 constituting the throat thereof and the meeting ends of the tapered walls 17 and 21. A rearwardly inclined sump 23 is carried by the bottom wall of the unit forwardly of the inner end thereof and the lower end of said sump 23 in proximity of the storage chamber wall 11 carries a drain pipe 24 fragmentarily illustrated in Figure 2 as draining into the sump chamber 25.

A valve controlled water supply pipe 26 is in communication with the sump chamber 25 for replenishing said chamber with water when desired. A water spray device and turbine driven fan are mounted within the spray draft unit in proximity of the throat 18 of the Venturi construction thereof and water is supplied to the water spray device and to the turbine for operation of the fan from the sump chamber 25 through the medium of a pipe 27 shown in Figure 2 as having a water pump 28 embodied in the pipe between the sump chamber 25 and said pipe. The other end of the water pipe 27, as shown in Figure 1, has branch connections 29 and 30 respectively leading to the water spray device and the fan driven under control of a three-way valve 31 and said branch pipes 29 and 30 also have manually operable valves 32 and 33, respectively.

The branch pipe 29 extends into the spray draft unit through the tapered side walls 17 thereof as illustrated and carries within said spray draft unit a multiple water spray device 34 located at the throat 18 of the Venturi construction. A turbine 35 is located within the spray draft unit in the area thereof bounded by the tapering side walls 17 and is in communication with the water supply branch pipe 30, the turbine being supported in any suitable manner and having a drain pipe 36 discharging into the sump 23 for the return of the discharged water to the sump chamber 25. The forwardly directed shaft 37 of the turbine 35 carries a fan wheel 38 in line with and directly rearwardly of the spray device 34 and in proximity of the throat 18 of the Venturi construction. It will be observed that the pump 28 provides a uniform pressure on the branch pipes 29 and 30 for supplying water to the spray draft 34 and for the operation of the turbine 35 under control of the three-way valve 31 or the branch pipe valves 32 and 33.

The front end 22 of the spray draft unit 10 has set therein an eliminator 39 spaced inwardly of the terminal end and a heating or cooling surface 40 at the terminal end. The eliminator comprises a plurality of vertical crenelated blades 41 arranged in spaced nested relations to form tortuous passages therethrough to effect precipitation of moisture from the air when humidified air flows therethrough at dew point. To rapidly increase the humidity of the air within the storage chamber bounded by the wall 11, the eliminator blade 41ᵃ at one side of the eliminator 39 is adjustable with respect to the inner end portion 22 and the adjacent eliminator blade 41 to provide, as shown in Figure 4, a fogging passage 42 so that air heavily laden with moisture in the form of a fog may flow through the eliminator at one side thereof and into the storage chamber. To operate the single shiftable eliminator blade 41ᵃ, there is provided a bracket 43 projecting laterally of the inner end 22 of the spray draft unit and upon which a hand lever 44 is pivotally mounted as at 45 intermediate the ends thereof, one end of the lever having a pivotal connection 46 with an arm 47 carried by the movable blade 41ᵃ and projecting through a side wall of the end 22 of the spray draft unit, a link connection 48 being provided between the bracket 43 and the arm 47 for reinforcement purposes.

The heating or cooling surface 40 has inlet and outlet pipes 49 and 50 to which hot or cold water is flowed and said surface 40 includes the usual fin formation 51 to increase the heating or cooling area of said surface.

From the above detailed description of the invention it is believed that the construction and operation thereof will at once be apparent, it being noted that the sump chamber 25 may be supplied with water from the pipe line 26 and suitable flow devices may be embodied therein to maintain a constant level. The pump 28 is operated for drawing water from the sump chamber 25 and forcing the same through the pipe line 27 under control of the three-way valve 31 to either or both of the branch pipes 29 and 30 and said branch pipe communicates respectively with the water spray device 34 within the spray draft unit at the throat 18 of the Venturi construction thereof and the turbine 35 also within the spray draft unit that carries the fan 38 directly rearwardly of the spray device 34 and in proximity of the throat 18 of the Venturi construction. Water to the spray device 34 and for the operation of the turbine 35 is delivered at the same pressure. The water spray device may be operated alone and during the spraying of water toward the end 22 of the spray draft unit air is drawn through the spray draft unit to the inner end thereof and through the opening 12 in the storage chamber wall 1 so that fresh outside air is drawn into and circulated through the storage chamber. The eliminator 39 is operative to capture excess water in the humidified air and the heating or cooling surface 40 effects the discharged air into the storage chamber at the desired temperature for the preservation of fruit in the storage chamber. When it is desired to increase the humidity of the air in the storage chamber, the side edge blade 41ª of the eliminator 39 is operated to increase the area of the fog passage 42. It is also intended that air within the storage chamber be recirculated and this is effected by the operation and positioning of the damper 16 with respect to the opening of the bottom wall 15 at the inner end of the spray draft unit. Under control of the three-way valve 31 and the branch pipe valves 32 and 33, the spray device 34 may be shut off and water under pressure of the pump 38 delivered to the turbine 35 for the operation of the fan 38 alone and at which time air in its natural state will be circulated through the storage chamber. When both valves 32 and 33 are open and the three-way valve 31 correctly positioned water flows to both the spray device 34 and the turbine 35 for the operation of the fan 38 and at this time an increased volume of humidified air is discharged through the spray draft unit under control of the eliminator 39 and at the desired temperature effected by the heating or cooling surface 40. The structure is unusually compact, practically all of the elements being confined within the Venturi construction of the spray draft unit, the throat of the Venturi construction being effective for moving the air through the spray draft unit either under influence of the water spray device 34 or the fan 38.

While there is herein shown and described the preferred embodiment of the invention, it is to be understood that minor changes may be made in the details of construction, such as will fall within the scope of the invention as claimed.

I claim:

1. In an air conditioning device, a spray draft unit including a horizontal duct of Venturi construction defining a Venturi throat, a spray nozzle located at said Venturi throat and directed horizontally toward the outlet end of the duct, a fan in the duct rearwardly of and adjacent the spray nozzle, controlled means for individual and simultaneous operation of said spray nozzle and fan, an eliminator in the duct adjacent the outlet end thereof and means at the outlet end of the duct for regulating the temperature of air flowing through said duct, said eliminator including a plurality of vertical crenelated blades and one of said side blades being shiftable toward and away from the adjacent blade to provide a fogging passage at one side of the eliminator.

2. In an air conditioning device, a spray draft unit including a horizontal duct of Venturi construction defining a Venturi throat with outwardly flaring portions extending in opposite directions from the throat, a spray nozzle located at said Venturi throat and directed horizontally toward the outlet end of the duct, a fan in a larger part of the duct rearwardly of and adjacent the spray nozzle to increase Venturi activities at the Venturi throat, controlled means for individual and simultaneous operation of said spray nozzle and fan whereby air may be forced through the duct in a substantially dry condition or in an increased humidified condition, an eliminator in the duct adjacent the outlet end thereof and means at the outlet end of the duct for regulating the temperature of the dry or humidified air flowing through said duct.

3. In an air conditioning device for a storage chamber for citrous fruits and the like, a spray draft unit in said chamber, including a horizontal duct having one end communicating with the outside atmosphere and the other end opening into the chamber, said duct being of Venturi construction defining a Venturi throat with outwardly flaring portions of the duct extending in opposite directions from the throat, a spray device in the duct at said Venturi throat and directed horizontally toward the outlet end of said duct, a fan in a larger part of the duct rearwardly of and adjacent the spray device to increase Venturi activities at the Venturi throat, a turbine operating said fan, a sump carried by the lower side of said duct, a sump chamber in communication with said sump, a conduit having one end communicating with the sump chamber, the other end of the conduit carrying branches leading to the spray device and turbine, means for forcing water under the same pressure from the sump chamber through said conduit and branches to the spray device and turbine and valve devices in the conduit and branches for controlling communication of the sump chamber with the spray device and turbine.

WILLIAM MARION NIEHART.